Patented Feb. 16, 1943

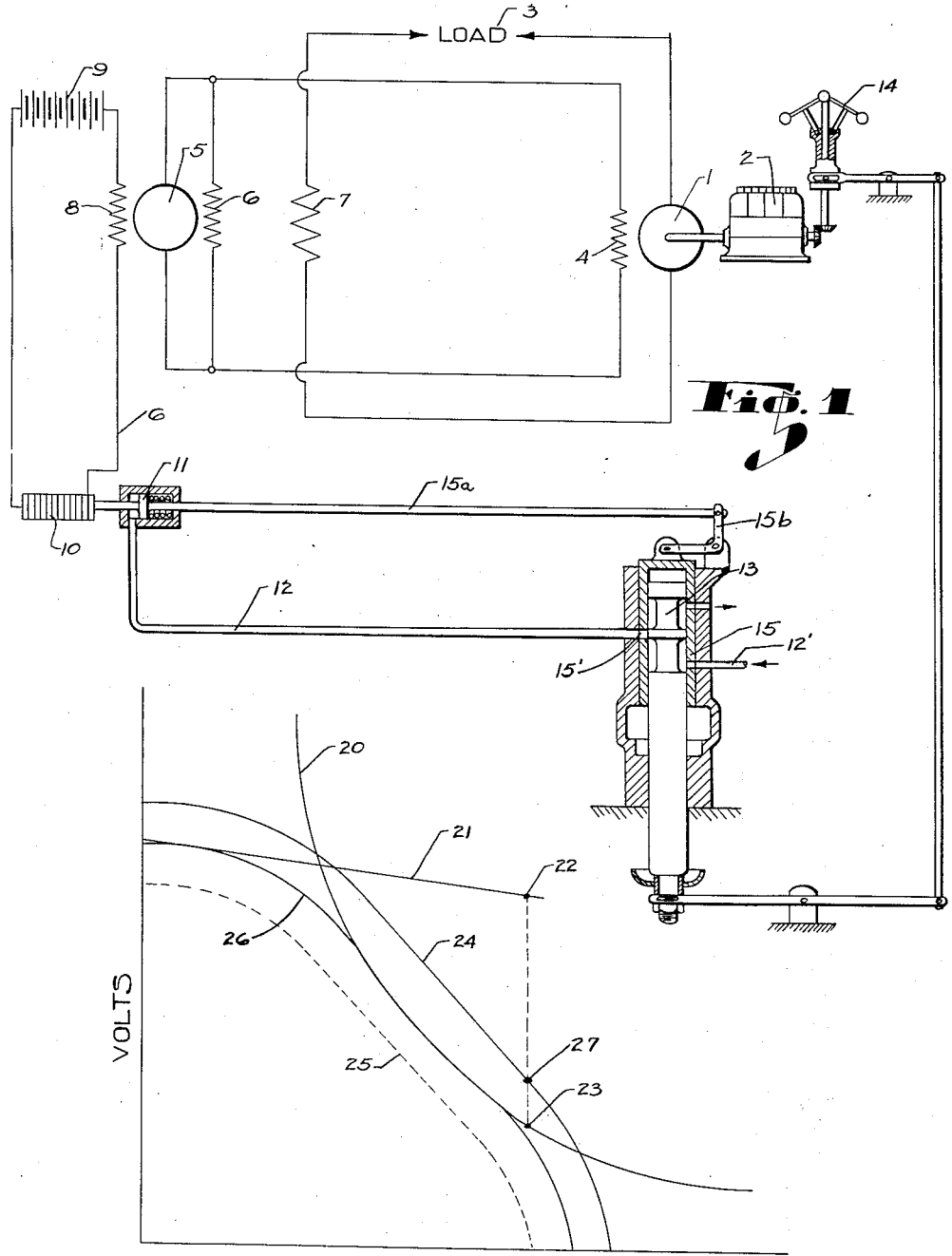

2,311,285

UNITED STATES PATENT OFFICE 2,311,285

CONSTANT LOAD CONTROL FOR ENGINE GENERATOR UNITS

John J. Stamm, Chester Heights, Pa., assignor to The Baldwin Locomotive Works, a corporation of Pennsylvania Application August 12, 1941, Serial No. 406,563

5 Claims. (Cl. 290—7)

This invention relates generally to internal combustion engine generator equipment and more particularly to an improved electrical load regulating system.

In locomotives employing an internal combustion engine, such as a Diesel engine, and a generator driven thereby for electric traction purposes, it is desirable to regulate the generator output so that the engine will operate under maximum constant horsepower output without the possibility of being stalled on account of overload.

Certain arrangements have heretofore been proposed and used but they are deficient in various respects either functionally, structurally or economically.

It is an object of my invention to provide an improved electrical load regulator system for an internal combustion engine and generator driven thereby. A further object is to provide an improved load regulating system that will permit full utilization of the maximum constant horsepower output available in an internal combustion engine driving a generator for electric traction purposes.

A further object is to provide an improved load regulating system whereby the load regulator may be of relatively small capacity while effectively controlling the generator so that maximum horsepower output from the engine will be available under all load conditions.

Another object is to provide an improved electrical load regulating system for an engine and generator whereby the regulating equipment is relatively simple and economical in construction, operation and maintenance and yet has a high degree of flexibility and sensitivity of control combined with ruggedness and dependability, this being accomplished herein by placing a load regulator in either one of the exciter fields preferably the battery exciter field, although it may be placed in the exciter shunt field.

Other objects and advantages will be more apparent to those skilled in the art from the following description of the accompanying drawing in which:

Fig. 1 is a wiring diagram with certain mechanical elements diagrammatically outlined; and Fig. 2 are curves showing the relationship of various generator, engine and regulating characteristics that are useful in clearly understanding my improved control system.

In the particular embodiment of the invention disclosed herein for purposes of illustration, I have diagrammatically shown a main generator 1 driven by a prime mover, such as an internal combustion engine 2, preferably of the Diesel engine type, adapted to supply current to a suitable load 3 which may be specifically considered as an electric traction load such as electric locomotives. The main generator field winding 4 is supplied with current from an exciter 5 mechanically driven by the engine 2. A usually exciter shunt field 6 is connected across the exciter while a differential field 7 connected in series with the main generator load and preferably built into the exciter opposes the exciter shunt field 6. A usual exciter battery field 8 is energized by a battery 9 while an automatic engine speed controlled load regulator 10, preferably in the form of a carbon stack, is connected in series with the exciter field 8. The fields 6 and 8 are cumulative in their effect and hence both are in opposition to the differential field 7.

A spring biased plunger 11, which is controlled by fluid pressure supplied through a pipe 12 from any suitable constant pressure source 12', exerts a variable pressure on the carbon stack to vary its resistance and accordingly the strength of field 8. The fluid pressure for the carbon stack is variably controlled in accordance with the engine speed through a valve 13 which is operated by a usual engine speed governor diagrammatically indicated at 14. A drop in engine speed below normal in response to an increased generator load will admit fluid from pipe 12' through valve 13 and pipe 12 to move plunger 11 to the right against its spring and accordingly reduce the pressure in carbon stack 10 and consequently decrease the field strength and engine load and allow the engine speed to return substantially to normal. Movement of plunger 11 is transmitted, as diagrammatically shown through a link 15a and bell crank 15b, to a restoring or compensating valve sleeve 15 so to close the valve port 15' and hence minimize governor hunting. Conversely, when the engine speed increases above normal in response to a decreased load valve 13 bleeds fluid from the cylinder of plunger 11 so as to allow increased spring pressure on the carbon stack with consequent decrease of resistance and increase of field strength thereby increasing the load on the engine and causing its speed to return substantially to normal. Again the compensating sleeve functions to close port 15' to prevent hunting. The foregoing variations of field strength cause a constant load to be maintained on the engine thereby preventing an overload being imposed on the engine. If an overload is allowed then it may reach a point where the engine would stall whereas by maintaining a maximum constant load on the engine it will never be stalled because its speed will remain substantially constant although this may be usually accompanied by slowing down the speed of the locomotive as for instance when a grade is encountered. This load control is obtained herein by employing a relatively small carbon stack regulator, its small size being by reason of its position in an exciter field which inherently draws a relatively small amount of current compared to the main generator field winding 4 and also because of the use of the differential field in combination with a constant battery field.

To appreciate not only the means whereby a small size regulator may be employed but also to appreciate the nicety with which the engine may be maintained at a maximum constant load within relatively narrow limits of variation as compared to the more costly and larger prior art regulating systems, it must be first understood that the maximum constant horsepower curve of a Diesel engine in terms of volts and amperes is represented at 20, Fig. 2. An increase of load results in an increase of amperes and a drop of voltage as shown by the curve 20 thereby indicating a constant horsepower output, such as full load. It is desirable in actual operation to have the engine output follow this horsepower curve as closely as possible thereby preventing the engine being stalled as the traction load increases. If the generator were excited from a constant source as indicated by the curve 21 without a differential winding and should it be attempted to maintain the generator output within the maximum horsepower capacity of the engine, it will be seen that it would be necessary to bring the generator voltage from a point such as 22, for example, down to a point 23 on the maximum horsepower engine curve. The distance between points 22 and 23 represents a very substantial range of voltage variation and prior attempts to effect the necessary voltage control through this range have required expensive and large regulating equipment.

If a differential winding 7 is used in combination with constant excitation of field 8 the generator voltage curve takes the shape as shown for example by curve 24. To maintain constant horsepower for this combination it only becomes necessary to bring the voltage point 27 down to the point 23 on the constant horsepower curve. It is evident that this requires much less voltage regulation and accordingly the voltage regulating devices become much smaller and simpler than would be the case if the differential field is not used in combination with the constant battery field. In accordance with my invention by using the regulator 10 in combination with differential field 7 voltage characteristic curve 24 can be made to coincide with curve 20 so as to fully load the Diesel engine, yet at the same time prevent overloading the engine.

This arrangement of regulator and differential field also permits the engine to run at full load and prevents overloading over a wide range of temperatures. Without the regulator in operation assume that the generator is adjusted when hot to match as nearly as possible the constant horsepower curve of the engine. This condition would be indicated by voltage characteristic curve 26. When the generator becomes cold the voltage characteristic would increase for exemple to curve 24 due to the resistance of the field windings becoming less with the reduced temperature. Without the regulator, voltage curve 24 would overload the engine and cause it to slow down thereby reducing the engine output. With the voltage regulator in operation, however, curve 24 is adjusted to coincide with curve 20 thereby permitting the engine to develop full power.

If on the other hand the generator is adjusted when cold to match curve 26, then when the generator becomes hot the voltage characteristic drops to curve 25 due to the increase in resistance of the fields. Under this condition the engine never delivers full load when the generator is hot.

It is evident that without the regulator it is impossible to adjust the generator characteristic so that the engine delivers full load at all times. It is also evident that the regulator permits the voltage characteristic to be set according to curve 24 when the generator is hot and then the regulator adjusts curve 24 to coincide with curve 20 over all operating conditions.

From the foregoing disclosure it is seen that I have provided an extremely simple and effective regulating system that not only maintains a constant maximum engine output but also has a high degree of sensitivity, accuracy and responsiveness and is relatively economical in construction, operation and maintenance.

It will of course be understood that various changes in details of construction and arrangement of parts may be made by those skilled in the art without departing from the spirit of the invention as set forth in the appended claims.

I claim:

1. A regulating system for an engine and a generator driven thereby comprising, in combination, a generator exciter having a differential exciter field, and means for variably controlling the excitation of the exciter field automatically in accordance with variations in engine speed from a predetermined value so as to maintain the engine substantially at a constant output.

2. A regulating system for an engine and a generator driven thereby comprising, in combination, a generator exciter having a differential field and an opposing field that is energized by current independently of the generator and exciter currents, and means for variably controlling the strength of said independently excited field so as to maintain a substantially constant engine output automatically in accordance with variations in engine load from a predetermined value.

3. A regulating system for an engine and a generator driven thereby comprising, in combination, a generator exciter having a differential field and a battery and shunt fields, said latter fields being cumulative and opposing said differential field, a variable resistance in said battery field, and means for variably controlling said resistance solely in accordance with variations in speed of the engine from a predetermined value thereby to vary the exciter current so as to maintain a substantially constant output of the engine and generator.

4. A regulating system for an engine and a generator driven thereby comprising, in combination, a generator exciter having a battery and shunt fields, a variable resistance in said battery field, and means for variably controlling said resistance in accordance with variations in speed of the engine from a predetermined value thereby to vary the exciter current so as to maintain a substantially constant output of the engine and generator, said variable resistance having a carbon stack and a fluid controlled plunger which variably presses said stack automatically in accordance with variations of the engine speed.

5. A regulating system for an engine and a generator driven thereby comprising, in combination, a generator exciter having a battery and shunt fields, a variable resistance in said battery field, and means for variably controlling said resistance solely in accordance with variations in speed of the engine from a predetermined value thereby to vary the exciter current so as to maintain a substantially constant output of the engine and generator, said variable resistance being controlled by a valve having cooperating elements one of which is moved directly in accordance with the engine speed and the other of which is moved in accordance with variations in said resistance.

JOHN J. STAMM.